Figure 4:
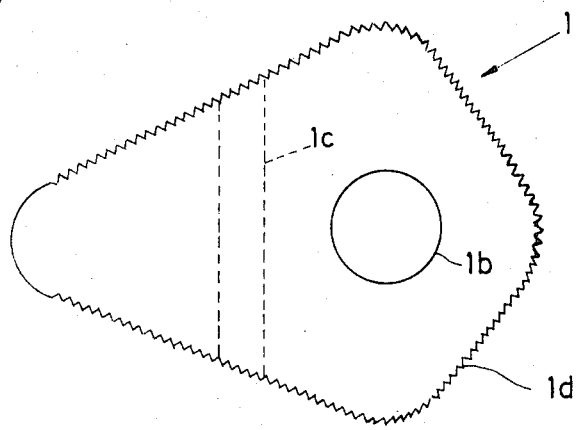

United States Patent [19]
Kassbohrer

[11] 3,733,096
[45] May 15, 1973

[54] BUMPER DEVICE
[75] Inventor: Karl Kassbohrer, Ulm/Donau, Germany
[73] Assignee: Karl Kassbohrer Fahrzengwerke GmbH, Ulm/Donau, Germany
[22] Filed: Mar. 15, 1971
[21] Appl. No.: 124,408

[30] Foreign Application Priority Data
Mar. 13, 1970 Germany..................P 20 12 033.6

[52] U.S. Cl. ......................293/63, 293/1, 293/71 P, 267/140
[51] Int. Cl. ............................................B60r 19/10
[58] Field of Search ..........................293/1, 63, 71 P; 280/158; 267/139, 140

[56] References Cited
UNITED STATES PATENTS
1,586,532 6/1926 Pampinella..............................293/1
3,432,200 3/1969 Barton....................................293/63
3,603,633 9/1971 Eshelman..............................293/71 P Primary Examiner—James B. Marbert
Attorney—Woodhams, Blanchard and Flynn

[57] ABSTRACT

An energy absorbing, or bumper, device, particularly for vehicles and especially to resist under-running by smaller vehicles of larger vehicles, as trucks, having a substantial overhang. An impact member has an impact receiving surface and an oppositely facing angular surface. A support holds the impact member in a suitable position and so bears against the angular surface in such a manner as to resist with a progressively increasing force movement of the impact member in response to impact. Springs, compression resistant materials and other means, including progressively collapsible structural means, can be added to the support device for further progressively resisting movement of the impact member.

19 Claims, 5 Drawing Figures

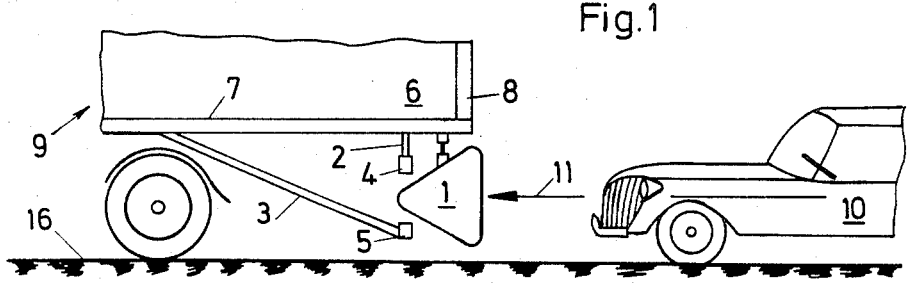
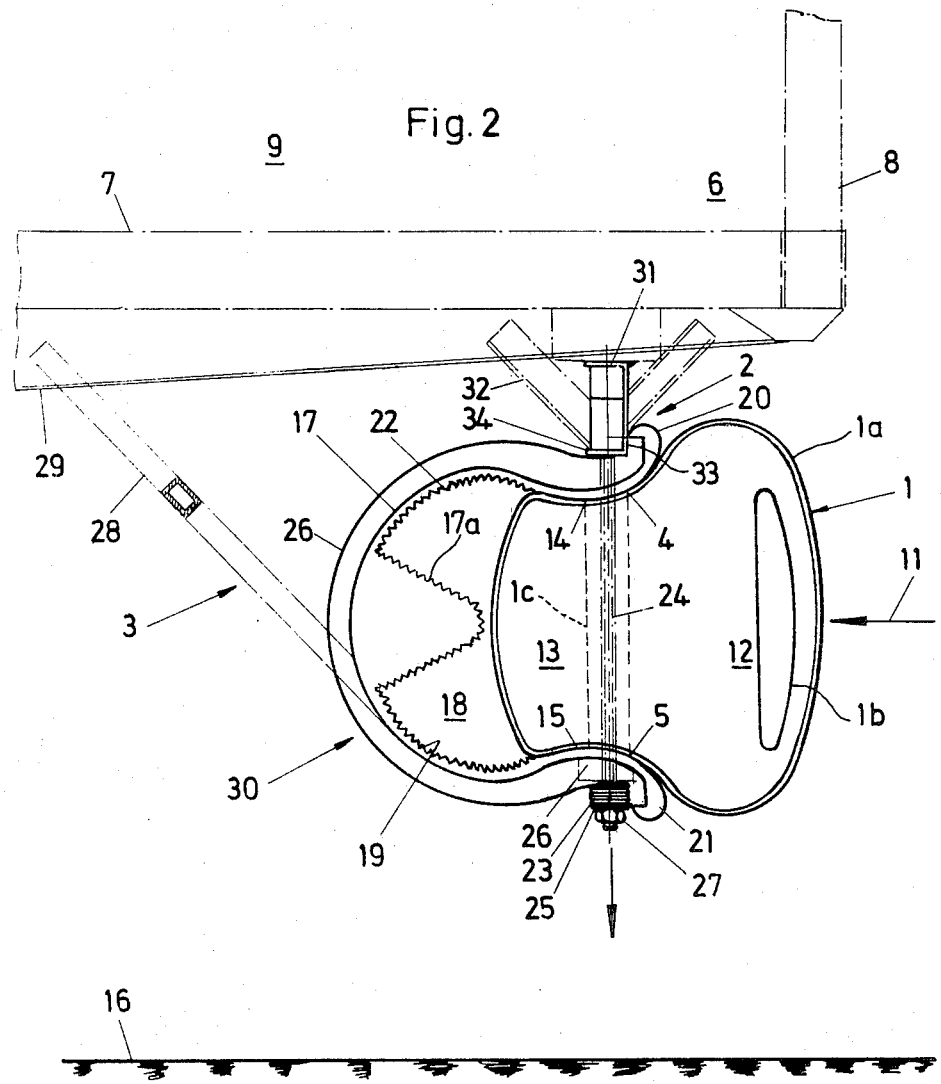

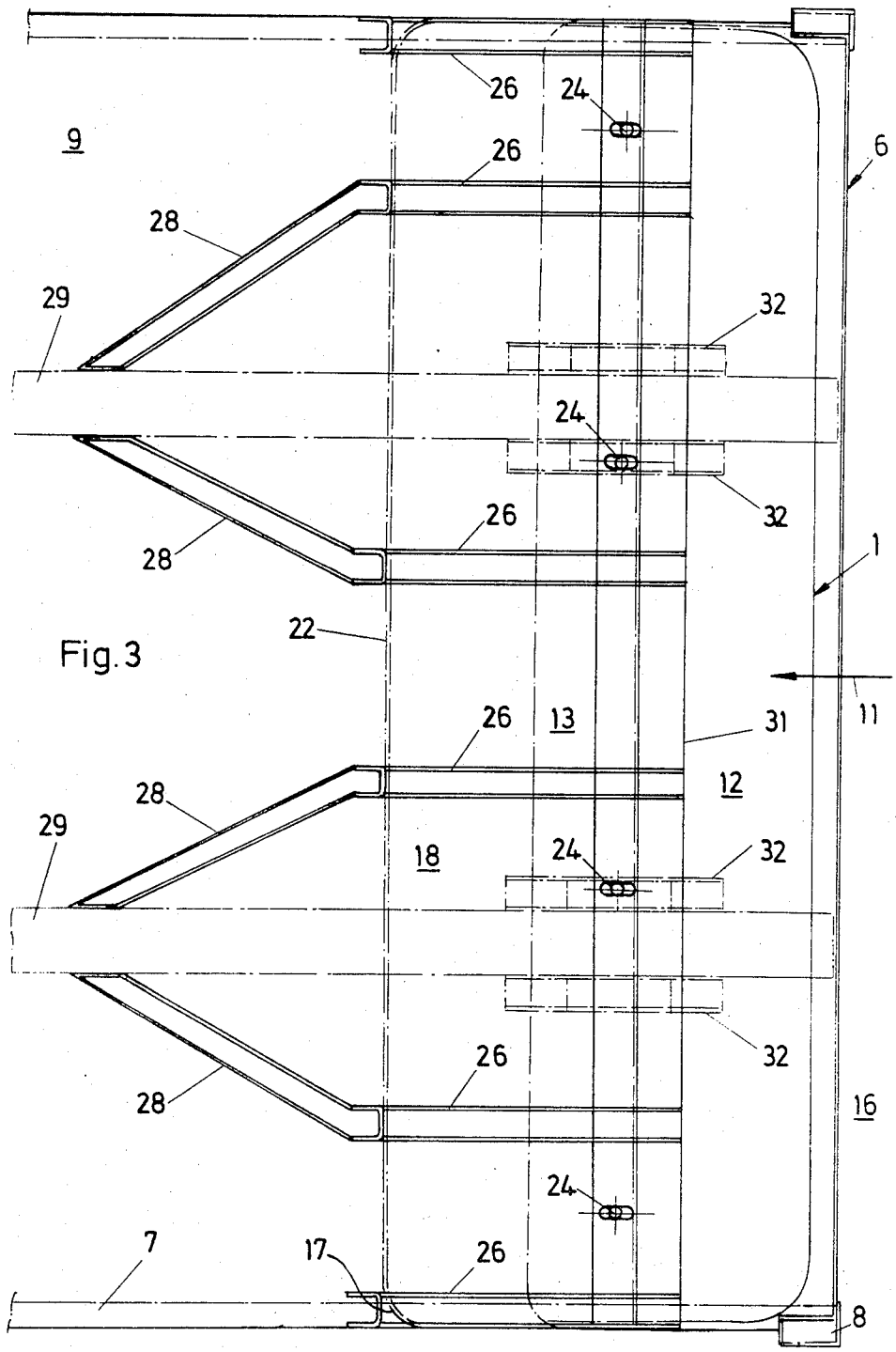

PATENTED MAY 15 1973 3,733,096

SHEET 3 OF 3

INVENTOR
KARL KÄSSBOHRER
BY
Woodhams, Blanchard & Flynn
ATTORNEYS

BUMPER DEVICE

The invention relates to a bumper device with an impact receiving member and a support device, particularly as a safety device providing against under running of vehicle parts which are located at a substantial distance above the ground.

So far no devices of the type mentioned above are yet known which truly meet the desires of the art. It is desired that such a bumper device be capable of mounting without appreciable additional expense at the rear of commercial vehicles and, if necessary, also in a bumper-like shape and reduced in size on the front end of passenger vehicles in such a manner as to minimize damage in case of a rear end collision by a passenger vehicle driving under the rear part of the truck which rear part extends relatively high above the street. Damaging the roof or other parts of a passenger vehicle is to be prevented thereby but at the same time the impact effect must be reduced through energy absorption due to deformation of the impact receiving member, at least to an extent as to protect the occupants of the passenger vehicle.

A further demand of such bumper devices is that the impact forces may not be transferred directly, or at least only, onto the frame of the commercial vehicle when the energy absorption capability of the actual impact receiving member is fully exhausted. On the other hand, the impact receiving member should be useable again after slight deformations or at least be easily exchangeable.

It is the purpose of the invention to construct and improve a device of the described type in such a manner that through the adjustability of one and the same basic construction a large area of the existing over-taking exposure can be controlled safely and economically and largely independent of the vehicle.

The invention achieves this purpose in such a manner that the support device has an opening into which the impact receiving member can be driven to provide an energy absorption upon the occurrence of an impact onto said impact receiving member.

Through the inventive construction, under the effect of an impact applied to the impact receiving member of the bumper device, for example through an overtaking passenger vehicle, aside from the energy absorption which occurs through the deformation of the impact receiving member, further impact energy is dissipated through friction and additional deformation of the impact receiving member in the opening. However, the driving of the impact receiving member into the opening effects not only an additional dissipation of kinetic energy without which the three-dimensional dimensions of the inventive bumper device would have to be enlarged compared with known devices, but moreover at the same time a relative movement with respect to the support device also occurs between the impact receiving member during the driving thereof into the opening. Thus, any elastic rebound is prevented. Moreover the dissipation of rebound energy effects a relief of the support device, namely a prevention of the danger of the deforming of the frame of the commercial vehicle and simultaneously an effect of reducing the impact of the over-taking vehicle. The operation of the bumper device of the invention is accordingly improved considerably in a surprisingly simple manner at at least three points which are important for evaluating such devices. In addition the construction of the invention permits a plurality of variations through which simple dampening problems up to the dimensions of bumper devices for rail vehicles, for example also bumper posts, can be effectively met.

Thus according to a preferred exemplary embodiment of the invention the additional energy absorption can be increased in such a manner that the opening is tapered in impact direction.

According to an advantageous further development of the invention, the support device has a support member which is constructed as a trough or groove with opening edges forming the opening. Thus, the impact receiving member which is first deformed on its impact side further during its entry into the opening is further deformed, whereby an additional energy absorption occurs through friction opposite the opening. An additional deformation is received by producing friction through the support member which is advantageously closed in impact direction behind the opening by forming a hollow space, through which an additional amount of impact energy is dissipated. It is thereby possible, by suitable stages of the energy absorption capacities which at least mathematically are rendered serially operable, to adjust the characteristic curve of the bumper device of the invention in a large zone to the respective requirements without the need for expensive tests or constructions which differ materially from the basic concept. For example the opening of the support member, for increasing the energy absorption or the friction, need not only be constructed as tapered in impact direction but moreover can also be constructed in stages or rippled, and/or can have a multiple opening arrangement which can be provided behind one another and/or side-by-side. Furthermore the side of the support member not facing the impact side can pass over into a further opening.

Contrary to the known bumper devices, the provisions of the present invention for the simultaneous and-/or staggered energy absorption are not limited to the occurrence of the impact in a horizontal plane. Rather, according to an advantageous further development of the invention, it is provided that the opening can be widened. Thus, it is primarily the support member which receives impact energy. At the same time the impact is materially dampened through the additional relative movement which occurs in correspondence with the degree of widening between the impact receiving member and the support device. If, for example, the bumper device is arranged as a protection against driving underneath the rear of a commercial vehicle with a relatively great weight, then it can be particularly advantageous if the opening can be widened transversely to the impact direction, particularly in vertical direction, namely toward the ground surface. In this case, there seldom exists any danger that the impact will lift the rear of the commercial vehicle. Rather, the commercial vehicle through its own weight and the support member which yields due to the widening of the opening transversely to the impact direction cooperate to catch in a rebound-free manner the parts of the over-taking vehicle, which parts have penetrated under the rear contour, or overhang, of the commercial vehicle. Thereby as a rule additional friction between the over-taking vehicle and the ground and also opposite the impact receiving member will occur from which again an additional dissipation of impact energy results. The opening can be provided with a certain elasticity of its own and/or the opening or the support member can have a breaking point so that the widening process and particularly a sharp bending thereof occurs as the result of a predetermined load.

It is also advantageous to construct the opening elastically widenable against the effect of springs. Through the deflection of these springs, additional impact energy is not dissipated but instead it is stored. Since the springs are located in the opening to operate vertically or transversely to the impact direction, a release of this stored energy equals an energy dissipation. The release of the energy which is stored perpendicularly to the impact direction can provide an additional dissipation of impact energy, particularly when the opening edges enter past the spring force into transverse folds formed during the impact in the impact receiving member.

According to a preferred embodiment of the invention it is provided that the opening edges are connected through pressure and/or tension members and same have a breaking point which becomes effective at a preselected load. It is thus possible, particularly in connection with springs, to adjust the widening of the opening in a very simple manner to the respective requirements. Thus, for example by using spring elements with a more or less long spring course, a relatively large energy absorption can be provided transversely to the impact direction until the tension members after overcoming an elastic maximum widening of the opening break at the breaking points selected and the opening in the nonelastic zone is further widened and deformed. Each of these individual deformation steps thus brings about an additional energy absorption whereby the entire energy absorption capacity of the bumper device of the invention is considerably larger on the basis of the displacement dampening and the three-dimensional deflection movement which is created in this manner is capable of much better dampening of the first impact in a rebound free manner than is possible with known bumper devices.

According to a further development of the invention it is provided that the impact receiving member consists of a plastic material which has a compressibility which is a function of its transverse expansion. In using such materials, relatively soft and small-volume bumper devices for extreme conditions can be manufactured for use relatively close to the ground so that the bumper devices of the invention can also be considered for passenger cars and can be used in place of the common bumpers without excessive adverse effect on the ground clearance or the vehicle contour. Moreover the different relationship between compressibility and transverse expansion is advantageous in that such impact receiving members are capable of assuring an extremely soft initial impact at a very high end energy absorption. Furthermore such plastics have the characteristic that they, aside from extreme load cases, show virtually no wear and have a long life.

For the proper operation of the bumper device of the invention, it is actually of no importance whether the impact receiving member is positioned in front of the opening in its initial position — seen in overtaking direction — or whether it already engages the opening. It is even possible to consider a bumper or any other part of the overtaking vehicle as support for the impact receiving member or the latter itself can be constructed as a type of a bumper, for example in the form of a mushroom.

Particularly for three-dimensional reasons it should, however, in most cases, be advantageous to provide the impact receiving member with a contraction area and to support the impact receiving member exclusively with this contraction area in the opening. Additional holding means are then not needed and in this manner further sources of danger resulting from overtaking accidents are avoided.

To secure the proper operation of the bumper device of the invention at extreme overload and at the same time to keep the inventive construction largely independent of vehicle types, in a preferred embodiment of the invention the support device has a holder for the support member which consists of suspension means in the zone above the opening and a strut system which engages the lower zone of the support member, which zone faces away from the impact side. With such a holder, the suspension is stressed for pull and the strut system for pressure such that after overloading a deformation of the strut system occurs and the impact member under an additional energy absorption undergoes a certain tilting movement with respect to the suspension means so that the then still remaining residual impact energy will usually be too small to completely tear the impact receiving member with the support member out of the holder. It is thus of importance that the holder of the invention be dimensioned in such a manner that such deformation occurs only at the final end point of an extreme impact load and that, on the other hand, deformation of the holder will seldom cause appreciable, if any, deformations of the vehicle frame.

Figure 5:
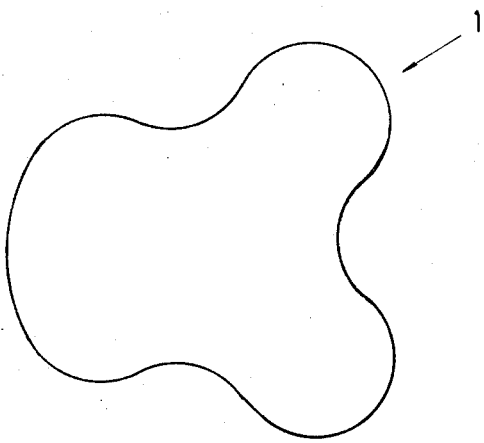

Further characteristics and advantages of the invention can be taken from the following description of one exemplary embodiment in connection with the claims and the drawings, in which:

FIG. 1 illustrates a model of an inventive bumper device which is arranged at the rear of a commercial vehicle which extends relatively high above the ground, FIG. 2 is a side-elevational view of a bumper device of the invention, FIG. 3 is a top view of the bumper device of the invention according to FIG. 2, and FIGS. 4 and 5 illustrate further embodiments of impact receiving members.

As can be seen from FIG. 1, the bumper device of the invention comprises an impact receiving member 1 and a support device 2 and 3 which forms an opening 4,5 with respect to said impact receiving member. The impact receiving member 1, which in FIG. 1 is shown as resiliently suspended at the rear 6 of a commercial vehicle 9 including a frame 7 and end wall 8, is pushed in the direction of the arrow 11 into the opening 4,5 through an impact created by a vehicle driving thereagainst and is thereby deformed both through the overtaking vehicle 11 at the impact side and also through the opening 4,5 at the side facing away from the impact, whereby the impact energy is dissipated.

FIGS. 2 and 3 disclose further details of the bumper device of the invention. Thus in FIG. 2, the impact receiving member 1 is not constructed triangularly as in FIG. 1 but has a cross section which is composed of elliptical cross-sectional parts 12 and 13 which are of different size and pass one into the other. The point of transition from the larger cross-sectional part 12 in impact direction 11 to the smaller cross-sectional part 13 is constructed as a contraction area 14,15. This special construction is advantageous when the impact receiving member 1 consists of a plastic material, the compressibility of which is a function of its transverse expansion. Also depending on the material used for the impact receiving member 1 its width, namely the transverse extension with respect to a ground 16, indicated by hatchings in FIGS. 1 and 2, and its thickness, namely the lengthwise extension in overtaking direction 11, are chosen by considering the maximum load and the energy absorption capability of the entire bumper device. In the illustrated exemplary embodiment, the width of the larger cross-sectional part 12 of the impact receiving member 1 corresponds approximately to its thickness, while the width of the smaller cross-sectional part 13 is larger than the smallest distance between the opening edges 4 and 5.

The impact receiving member 1 is supported in FIG. 2 exclusively on the opening defining edges 4 and 5 of a support member 17 which has a substantially circular base cross section. The support member 17 is open on the impact side and only partially covers the impact receiving member 1, namely primarily only its small cross-sectional part 13. The member 1, in the position illustrated in the drawing, fills the support member 17 only to about one third of its cross section so that a hollow space 18 remains between the side of the impact receiving member 1 not facing the impact side and the inside wall 19 of the support member 17. The inside wall of the support member can be constructed as a cup 19 having a relatively rough surface and can be provided with wall extensions 17a which act against the driving of the impact receiving member into the opening 4,5. During the deformation of the elastic impact receiving member, said wall extensions create a certain additional frictional resistance. Accordingly, the deforming operation and the dissipation of impact energy resulting therefrom by the impact receiving member 1, is already of substantial amount due to its complete filling of the hollow space 18 and its resting against the cup 19, before it receives additional impact energy. The impact receiving member 1, which, in the drawing, is inserted with approximately one third of its thickness into the opening 4,5 is guided with additional friction during driving in by outwardly curved roller flanges 20,21 provided on the opening edges 4,5 of the support member 17. An outer skin 1a which is closed on all sides and which, as can be seen in FIG. 4, can be provided with a corrugation 1d makes the impact receiving member 1 even more capable of resistance. Slot-shaped or pipe or ball-shaped hollow spaces 1b further assure that the impact forces operate substantially independently from the impact direction and independently of whether the impact point is always in the central zone of the impact member. For such an automatic centering of the impact, it can also be advantageous that the impact receiving member 1 has openings 1c which leave sufficient play with respect to the tie bars 24 so that the impact receiving member can be aligned suitably under the effect of the impact. As illustrated in FIG. 5, the outer shape of the impact receiving member can also be adjusted to the loads thereon which are expected. For example a mushroom with concavely constructed cap is very advantageous.

The support member 17 can be constructed rigidly but also elastically so that the opening edges 4,5 can be expanded. The provision of a groove or trough 22, as illustrated in FIG. 2, is advantageous with respect to elasticity and power absorption, particularly when the opening edges 4,5 are backed by springs 23 and/or are connected by pressure and/or tension members 24. A very simple, sturdy and functionally safe connection of the opening edges 4 and 5 is shown in FIG. 5 where a tie bar 24, starting from a suspension 2, extends past the upper opening edge 4, the impact receiving member 1 and the lower opening edge 5 and holds from below a reinforcement 26. A spring element 23 acts on the reinforcement with a screw nut 27, which spring element will provide a pretensioning of the impact receiving member 1 which with its contraction area 14,15 is positioned between the opening edges 4,5. The breaking load of such a tie bar can be easily adjusted to the desired load conditions by means of one or more breaking points 25, so that it is always assured that the tie bar will break only after utilizing fully the work receiving capacity of the impact receiving member 1, of the opening 4 and 5 and of the support member 17. It is most advantageous to arrange the breaking point 25 near the screw nut 27 or in the area of the spring element 23 because there the bolt is stressed only through longitudinal forces and thus can break only in response to the preselected longitudinal stress. However, before the breaking of the tie bar 24, the cup 19 of the support member 17 deforms under the effect of the impact receiving member 1. In order for the support member 17 to have a sufficient rigidity and still be capable of manufacture in a light construction, reinforcements 26 with preferably closed profile cross section are provided on the outside on the support member 17 and similarly shaped rods 28 are provided to extend from the spans 29 on the vehicle downwardly inclined to said reinforcements 26. Two pairs of these rods 28 form a strut system 30 in the lower zone of the support member 17, which zone faces away from the impact side. The strut system 30, together with the support member 17, forms the actual holder 3 which in turn, through the cooperation of the suspension 2 and the support member 17, forms the actual support device 2,3. The reinforcements 26 of the support member and the strut system 30 have a preferably closed profile cross section such that at least one profile portion upon breaking is stressed for pull. The suspension 2 consists substantially of a U-shaped traverse 31 which is supported by braces 32 connected with both ends of the spans 29. The traverse 31 is at its lower part constructed as an abutment 33 for the upper opening edge 4 so that there is no need for additional reinforcement of the sort as provided at 26 at the lower opening edge. The abutment 33 permits a certain tilting movement of the support member 17 in overtaking direction 11. Furthermore, the traverse 31 forms a further abutment 34 for the tie bar 24.

The operation of the bumper device of the invention is as simple as its construction. Under the effect on an impact in driving direction 11, first the larger cross-sectional part 12 of the impact receiving member 1, which part is not covered by the support member 17, is deformed on the impact side. Variations in the impact direction from the vertical on the impact receiving member 1 which can also extend at an inclination at the vehicle rear, particularly at its outer side, do not show any adverse effects. Thus, corresponding to the deformation of the impact receiving member, and depending on whether an impact receiving member 1 which is relatively soft or relatively hard in impact direction is used, the impact is more or less dampened. If the impact-receiving member is made entirely of rubber or entirely of a plastic or if the impact receiving member is provided with a sufficiently thick coat of a material which is elastic in at least one direction, then the impact is at the same time dampened also acoustically. The loud noise which occurs when sheet metal hits sheet metal can be reduced to a great extent and through this the known noise shock effect can be largely prevented.

For the discussion of the further operation of the bumper device of the invention it is first assumed that the impact receiving member 1 is constructed in a wedge-shaped manner and is driven against the rigidly supported means 4,5 defining an opening. No further discussion is needed to establish that a wedge, while it is being driven into a conical opening, has to overcome a relatively great friction force and that a considerable amount of impact energy is dissipated by this driving of the impact receiving member into the opening.

During the driving of the impact receiving member into the opening defining means 4,5, aside from the friction, also an additional deformation of the impact receiving member occurs through the opening defining edges 4,5 so that a further amount of impact energy is dissipated by this additional deformation.

As the wedge-shaped impact receiving member is driven in further, the wedge point then abuts the inside wall 19 in the hollow space 18 of the support member 17. The latter first tries, under friction, to deflect the wedge and then, under the further influence of the impact receiving member 1, at least the cup 19 of the support member is deformed. This dissipates further energy by the friction thus occurring and deformation thereafter following.

Thus continuing the above assumed conditions, the wedge will then drive in further and finally destroy the support member 17, deform or destroy the means defining the opening 4,5 and deform or tear off the holder 3, each time dissipating further amounts of impact energy. Even if this dissipating in stages of the impact energy, as a rule, is normally actually sufficient for the instances usually experienced in connection with rear-end accidents by passenger vehicles, the invention does not stop at this schematized solution but has shown in the solution illustrated in the exemplary embodiment important improvements in dampening of the impact and the simultaneous dissipation, or harmless deflection and subsequent dissipation, of the impact energy.

Thus by using an impact member 1 which can be compressed in impact direction at a function of its transverse resiliency, particularly the first impact is dampened much better than in the case of members which can only be deformed permanently. Rubber, or plastic with similarly elastic condition as rubber, can serve as impact receiving member. However, materials like for example cellular polyurethane are particularly suitable for the intended purpose because the different expansion conditions permit not only a very good dampening of the first impact but also a relatively low and space-saving construction and require fewer measures for avoiding an elastic rebound.

In using such materials for impact receiving members of the bumper device of the invention, among others, the following important differences are obtained as compared with the use of only permanently deformable impact receiving members. An impact receiving member 1 which is elastic in itself has, after passing through the opening 4,5, the tendency to expand. That is, the elasticity of the impact receiving member first tends in the hollow space 18 of the support member 17 to again assume its original shape and thereby engages the inside wall 19 with friction contact, then, as the load is maintained it progressively fills the hollow space 18 and is again compressed and absorbs still further energy. The part of the impact receiving member which has passed through the opening first regenerates, so-to-speak, and is then ready for a further additional energy absorption which is introduced under friction contact opposite the cup 19, transfers into deformation of the impact receiving member and finally by additionally deforming and dissipating an amount of impact energy leads to deformation of the cup 19 and the reinforcements 26 which externally surround the support member 17.

However, at the same time as the impact receiving member 1 penetrates further and its larger cross-sectional part 12 enters into the opening 4,5, a distortion of portions defining the opening 4,5 is also caused, whereby first the spring element 23 is compressed, then as a predetermined load is reached at least the cup 19 of the support member 17 is deformed, the breaking point 25 of the tie bar 24 yields and the force impelling impact receiving member tends to move the lower opening edge 5 downwardly against the reinforcement 26 of the support member 17 in force direction 11. Each of these steps results in the dissipation of an additional amount of impact energy. It is automatically understood that the development of the energy-dissipating process of the invention which has been dealt with above in connection with a simplified and schematized exemplary embodiment takes place not only uniaxially but multiaxially. This means that the longitudinal forces acting during the impact are transformed transversely to the impact direction, particularly also toward the sides, into transverse forces. The forces acting onto the impact receiving member 1 can also advantageously be deflected into a direction perpendicularly to the ground 16 so that in addition, for example, the front part of the overtaking vehicle 10 can be urged toward the ground.

While up to this point in the description, the support device comprised of the suspension 2 and the holder 3, corresponding to the designing and dimensioning of the impact receiving member 1 and the support member 17, has not yet been exposed to a load causing a permanent deformation, the impact energy which still remains after tearing off the tie bar 24, widening of the edges 4,5 and deformation of the support member 17 must now be absorbed by the strut means 30, namely substantially by the profile rods 28. The profile rods 28 are thereby deformed and the support member 17 tilts corresponding to the deformation of the profiles rods 28 with the impact receiving member 1 about the suspension 2 more or less in the force direction 11. By this, the impact receiving member 1 is urged still further downwardly in the direction of the impact energy from a substantially horizontal into a substantially vertical plane.

The support device 2,3 can, however, also be adjusted in such a manner that the suspension 2 is torn off before the rods 28 are stressed sufficiently to break. Rather the profile rods can be dimensioned to be of such stiffness and of such length that they bend downwardly upon the tearing off of the suspension 2 in response to continuing impact force with the impact receiving member 1 wedged into the support member 17 in the zone of the spans. Thus, by their dropping to the ground 16, there is provided a sort of inclined catching grid with the support member 17 and the impact receiving member 1 connected in front thereof. This catching grid resting on the ground 16 forms, even when the support member 17 and the impact receiving member 1 are completely destroyed or not provided, an independent buffer which is capable by lifting the front part of the overtaking vehicle 10 to prevent a further driving under the rear of the vehicle 6 with respect to the spans 29.

The invention is not limited to the exemplary embodiment. It would particularly also be possible, by maintaining the opening principle, to distribute the measures for the dissipation or deformation and deflection of the impact energy onto several impact receiving members which react simultaneously or in stages. The support device can also be constructed differently, for example, also the suspension of the opening and the impact receiving member can be carried out separately. Furthermore it would also be possible that a fire-protecting means is provided in the impact receiving member 1 or in a portion of the hollow space 18, which fire-protecting means can be expelled particularly against the impact direction under the effect of the impact. The device of the invention can also be combined with a safety cushion which inflates automatically under the effect of the impact. The bumper device of the invention can of course also be constructed in such a manner that it simultaneously takes over the function of rear fenders and/or mud guards and serves as carrier for tail lights, brake lights, flasher and a warning light, etc. Furthermore, recesses for trailer hitches, brake connections and lead-in wires can be provided, corresponding to the many possibilities of application, anywhere, where it is desired to dissipate impact energy with a soft initial effect and for avoiding injuries to persons and property damage. Finally as further possibilities of application of the bumper device of the invention, its kinematic reversal is also possible. For example, it can be applied in the form of landing shock absorbers for airplanes and space vehicles and as safety devices for cable railways, elevators, bridge columns of through-locks, particularly dangerous street curves, etc.

All characteristics disclosed in the description and the drawings, including their structural details, can also be important for the invention in any desired combination.

The embodiments of the invention in which an exclusive property or privilege is claimed are defined as follows:

1. A bumper device for use adjacent the rear ends of vehicles wherein a vehicle frame structure projects rearwardly of the vehicle wheels and the spacing between the ground and said vehicle frame structure is approximately equal to or greater than the diameter of said vehicle wheels, comprising:
   support frame means mounted in said spacing between the ground and said vehicle frame structure;
   means defining a receptacle on said support frame means adjacent said rear end of said vehicle and having means defining an opening therein opening rearwardly of said vehicle; and
   deformable impact absorbing means mounted in said receptacle means, said impact absorbing means including a deformable first part larger in size that said opening into said receptacle means and extending rearwardly of said opening into said receptacle means and a second deformable part integral with said first part received in said receptacle means, said first and second deformable parts of said deformable impact absorbing means being both adapted to be deformed when an external force is applied thereto in a direction generally toward the interior of said receptacle means, both said first and second parts being drivable into said receptacle means by said external force and frictionly engaging a portion of said receptacle means as they are driven into said receptacle means to thereby absorb the kinetic energy of said force.

2. A bumper device according to claim 1, wherein said opening into said receptacle means is generally rectangular and opens rearwardly across at least a major portion of the width of said vehicle.

3. A bumper device according to claim 2, wherein said rectangular opening comprises means defining a pair of vertically spaced edges; and
   wherein said receptacle means includes resilient means for resiliently supporting at least one of said edge means for movement away from the other of said edge means against the force of said resilient means as said deformable impact absorbing means is driven into said receptacle means.

4. A bumper device according to claim 3, wherein said resilient means further includes at least one breakable tensioning member which extends between said edge means adjacent the opening into said receptacle means.

5. A bumper device according to claim 4, wherein said deformable impact absorbing means comprises means defining at least one vertically extending opening therein for receiving said tensioning member.

6. A bumper device according to claim 5, wherein said tensioning member becomes breakable only after said edge has reached a point of maximum resiliency offered by said resilient means.

7. A bumper device according to claim 1, wherein said recepticle means comprises a trough-shaped member secured to said support frame means, said trough-shaped member opening rearwardly of said vehicle.

8. A bumper device according to claim 3, wherein said support frame means comprises a transverse suspension means secured to said vehicle frame structure; and
   wherein said tensioning member is secured at one end to said suspension means and to said one edge means at the other end.

9. A bumper device according to claim 8, wherein said suspension means comprises bracing members secured to said vehicle frame structure.

10. A bumper device according to claim 1, wherein said receptacle means comprises a plurality of laterally spaced U-shaped members secured to said support frame means and opening rearwardly of said vehicle and an elongated, laterally extending trough-shaped member received in the U-shaped members, is secured thereto and extends therebetween, said deformable impact absorbing means being mounted in said trough-shaped member.

11. A bumper device according to claim 10, wherein said trough-shaped member has a roughened surface on the interior thereof to resist the movement of said deformable impact absorbing means into said trough.

12. A bumper device according to claim 11, wherein said trough-shaped member includes means defining a wedge-like member extending from the interior bottom wall of said trough-shaped rearwardly and terminating adjacent the frontwardly most portion of said second part.

13. A bumper device according to claim 12, wherein said wedge-like member has a roughed surface inside said trough-shaped member.

14. A bumper device according to claim 1, wherein said deformable impact absorbing means has means thereon defining a horizontally aligned opening therethrough.

15. A bumper device according to claim 14, wherein the axis of said opening is longitudinally aligned with the longitudinal axis of said vehicle.

16. A bumper device according to claim 14, wherein the axis of said opening is transverse to the longitudinal axis of said vehicle.

17. A bumper device according to claim 1, wherein said support frame means is breakable upon the application of a force thereto which exceeds a predetermined magnitude.

18. A bumper device according to claim 17, wherein the resistance to deformation of said impact absorbing means is less than the resistance to breakage of said support frame means.

19. A bumper device according to claim 1, wherein said first part of said deformable impact absorbing means forms an arcuate surface extending from top to bottom, the total height of said first part being at least greater than said opening into said recepticle means.

* * * * *